(12) United States Patent
Baralt et al.

(10) Patent No.: US 7,709,425 B2
(45) Date of Patent: May 4, 2010

(54) OXIDIZED OLEFIN WAX POUR POINT DEPRESSANTS

(75) Inventors: Eduardo J Baralt, Kingwood, TX (US); Hu Yang, Manvel, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 1057 days.

(21) Appl. No.: 11/260,524

(22) Filed: Oct. 27, 2005

(65) Prior Publication Data

US 2007/0095723 A1    May 3, 2007

(51) Int. Cl.
   C10M 143/18    (2006.01)
   C10L 1/18    (2006.01)
(52) U.S. Cl. ............... 508/312; 44/309; 208/20; 208/21
(58) Field of Classification Search ........ 508/450, 508/312; 44/309; 208/20, 24
   See application file for complete search history.

(56) References Cited

U.S. PATENT DOCUMENTS

| | | |
|---|---|---|
| 2,197,768 A | 4/1940 | Pier et al. |
| 2,197,769 A | 4/1940 | Pier et al. |
| 2,220,345 A | 11/1940 | Moore, Jr. et al. |
| 2,900,322 A | 8/1959 | Zoeller |
| 3,224,956 A | 12/1965 | Phillips et al. |
| 3,329,602 A | 7/1967 | Moyer et al. |
| 3,374,073 A | 3/1968 | Gergel et al. |
| 3,388,067 A | 6/1968 | Takashima et al. |
| 3,388,977 A | 6/1968 | Burkard et al. |
| 3,756,999 A | 9/1973 | Stetter et al. |
| 3,901,789 A * | 8/1975 | Michael et al. ........ 208/33 |
| 3,941,608 A | 3/1976 | Ehrhardt et al. |
| 3,994,737 A | 11/1976 | Bienvenu |
| 4,004,932 A | 1/1977 | Bienvenu |
| 4,180,408 A | 12/1979 | Bienvenu et al. |
| 4,426,229 A | 1/1984 | Bolton et al. |
| 4,862,908 A * | 9/1989 | Payer ................ 137/13 |
| 4,925,579 A | 5/1990 | Stemke |
| 5,851,429 A | 12/1998 | Magyar |
| 2003/0207971 A1 | 11/2003 | Stuart, Jr. et al. |
| 2004/0065003 A1* | 4/2004 | O'Rear ............... 44/389 |

FOREIGN PATENT DOCUMENTS

| | | |
|---|---|---|
| GB | 918295 | 2/1933 |
| GB | 1482972 | 8/1977 |
| WO | WO2006/057834 A1 | 6/2006 |

OTHER PUBLICATIONS

International Search Report and Written Opinion, PCT/US06/041768, Mar. 22, 2007, 12 pages.

* cited by examiner

*Primary Examiner*—Glenn A Caldarola
*Assistant Examiner*—Taiwo Oladapo (57) ABSTRACT

An oxidized olefin wax useful as a pour point depressant for hydrocarbon compositions and/or additive to reduce the wax particle size of wax precipitates in hydrocarbon compositions is described. Method for reducing the pour point and/or wax particle size of hydrocarbon composition with an oxidized olefin wax are described.

29 Claims, 1 Drawing Sheet

Figure 1

OXIDIZED OLEFIN WAX POUR POINT DEPRESSANTS

BACKGROUND OF THE INVENTION

Crude oils, crude distillates (e.g. gas oil, petroleum fuel, diesel oil, heating oil, kerosene, etc. . . . ), residual fuels and/or residual oils often contain waxy constituents which can precipitate when the crude oil, crude distillate, residual fuel and/or residual oil are subjected to lower temperatures. Depending upon the particular composition, crude oil, crude oil distillates, residual fuels and/or residual oils can lose their fluidity as the waxy constituents precipitate from the bulk solution. The precipitation of the waxy constitutes can cause problems during the recovery, transport, storage and/or use of the crude oils, crude oil distillates, and/or residual oils. In crude oil recovery and transport, the wax precipitates can deposit on pipeline walls causing difficulty in pumping and in some cases complete blockage of the pipeline which can be a particular concern for the transport of crude oil in areas having low temperatures (e.g. sub arctic areas). In storage and further processing of crude oils, the precipitates can necessitate heated storage for the crude oils, crude oil distillates, residual fuels, and residual oils to limit settling and agglomeration of the wax precipitates. In use, the waxy constituents can result in formation of precipitates in storage tanks, cause plugged transport or fuel lines, and/or block filters in engines and furnaces, preventing reliable metering of the fuels and in some cases causing complete interruption of the supply of the fuel or heating medium.

The problems associated with the loss of fluidity of hydrocarbon oils and wax precipitate formation in crude oils, crude oil distillates, residual fuels, and/or residual oils at low temperatures are of considerable concern. Parameters such as pour point, and cloud point are often used to measure the flowability and wax precipitate formation properties of crude oils, crude oil distillates, residual fuels, and/or residual oils. Pour point (ASTM D97-47) is defined as the lowest temperature at which a material will flow when chilled without disturbance under specified conditions while the cloud point (ASTM D 2500) is the temperature at which a precipitates first appear as a haze in a material upon cooling. A material's pour point indicates the temperature at which (if not before) the formation of solid or semi-solid precipitate particles can begin to affect the flowability and/or pumpability of these materials under low temperature conditions making the transport and pumping of the material difficult if not near impossible. A material's cloud point (ASTM D 2500) indicates the temperature at which the waxy constituents having the lowest solubility (typically those having the highest molecular weight) begin to precipitate and can begin create problems in filtering the material.

In order to avoid difficulties with the precipitation of waxy constituents during production, storage, transport, processing, and use, additives are often added to crude oil, crude oil distillates, residual fuel, and/or residual oils to decrease the wax precipitate particle size, change wax precipitate particle structure, reduce settling and/or agglomeration of the wax precipitate particles, and/or maintain or improve their low temperature flow properties. These additives can modify the size, number, and/or growth of the precipitated wax particles in the crude oil, crude oil distillate, residual fuel, and/or residual oil in a way that imparts improved low temperature handling, transport, storage, pumpability, and/or use. In some instances, the additive or combination of additives reduce the pour point of the crude oil, crude oil distillate, residual fuel and/or residual oil. The additive or combinations of additives that reduce pour point are accordingly called pour point depressants.

Generally, pour point depressants do not make the wax constituents more soluble in oil. Rather pour point depressants function by reducing wax particle size, changing wax particle shape, and/or disrupting or preventing the formation of a waxy precipitate network by interacting physically with the precipitating wax. This interaction results in the size, shape, and/or adhesion properties changes in the wax precipitates. Thus, the addition of pour point depressant can ease the pumping, filtering, processing or use of a material at a particular set of conditions or alternatively enable the pumping, filtering, processing or use of a material at conditions under which the material alone cannot.

Many different types of compounds have been used as different pour point depressants including alkylated aromatic compounds, phenol/aldehyde condensation products, olefin oligomers, copolymers of ethylene and alpha olefins, ethylene/propylene polymers that have been oxidized and hydrogenated, ethylene/vinyl acetate based polymers, acrylate based polymers, maleic anhydride/alpha olefin based copolymer, and maleic anhydride/alpha olefin Diels-Alder adduct based compounds, among others. However, many of these materials are polymers and/or high molecular weight materials. Herein is described a simple non-polymeric material which can function as a pour point depressant.

SUMMARY OF THE INVENTION

It has been discovered that olefin waxes that have been selectively oxidized can advantageously lower the pour point of a hydrocarbon composition and/or decrease the average wax particle size of waxy precipitates in a hydrocarbon composition. The present invention accordingly provides for compositions comprising a hydrocarbon composition and an oxidized olefin wax having a pour point lower than the pour point of the hydrocarbon composition alone. The invention also provides for compositions comprising a hydrocarbon composition and an oxidized olefin wax having an average wax particle size smaller that the average wax particle size of the hydrocarbon composition alone. The invention also provides methods for decreasing the pour point of a hydrocarbon composition and/or reducing the average wax particle size in a hydrocarbon composition.

The oxidized olefin waxes which can be utilized for decreasing the pour point and/or decreasing the average wax particle size of a hydrocarbon composition can have an acid number ranging from 1 to 40 mg KOH/g oxidized olefin wax. Alternatively, the oxidized olefin waxes which can be utilized for decreasing the pour point and/or decreasing the average wax particle size of a hydrocarbon composition can have a saponification number ranging from 2 to 90 mg KOH/g oxidized olefin wax.

Various embodiments of the invention can include any combination of the embodiments, features, and aspects described herein.

DEFINITIONS

The term "hydrocarbon composition" whenever used in the specification and claims refers to compositions comprising at least one hydrocarbon compound. The hydrocarbon composition can include compositions having compounds comprising only hydrogen and carbon and compounds comprising other elements in addition to hydrogen and carbon. Thus, the term "hydrocarbon composition" is not intended to describe compositions comprising only hydrocarbons. For example, crude oil, crude oil distillate, residual fuel, and residual oil all fall within the definition of hydrocarbon composition even though these compositions can contain compounds comprising elements in addition to hydrogen and carbon.

The term "crude oil" whenever used in this specification and claims denotes all types of mineral oils found in nature. Crude oil includes oils obtained from wells, shale, rock and/or sand among others.

The term "crude oil distillate" refers to any distillation overhead product—be it a fuel, oil, and/or some other product—obtained from the distillation (atmospheric or subatmospheric) of crude oil or refined crude oil. Crude oil distillates also include fuels, oils, or other products that have been obtained from the distillation of crude oil obtained by the thermal cracking and/or catalytic cracking of crude oil. Other processes which can be practiced on the crude oil during or prior to obtaining the crude oil distillate include solvent extraction, caustic treating, acid treating, dewaxing, desulfurizing, and reforming among other crude oil refining processes.

The term "residual oil" and "residual fuel" refers to any products, be it fuel or oil, at least partially composed of residual components, residues, from the distillation (atmospheric or subatmospheric) of crude oil and/or refined crude oil. The terms "residual oil" and "residual fuel" also includes fuels, oils, and other products that have been obtained from the distillation of thermally and/or catalytically cracked crude oil. Other processes which can be practiced on the crude oil during or prior to obtaining the residual fuel or residual oil include solvent extraction, caustic treating, acid treating, dewaxing, desulfurizing, and reforming among other crude oil refining processes.

The term "synthetic hydrocarbon composition" refers to compositions comprising one or more hydrocarbons synthesized from small carbon containing molecules. The synthetic hydrocarbon composition can include compositions having synthetic compounds comprising only hydrogen and carbon and compounds comprising other elements in addition to hydrogen and carbon. Additionally, the synthetic hydrocarbon compositions can also contain non-synthetic materials. Non-limiting examples of synthetic hydrocarbon compositions include hydrocarbons produced by a Fischer-Tropsch synthesis (oligomerization of carbon monoxide in the presence of hydrogen) and hydrocarbons produced by an olefin oligomerization process. The term "synthetic hydrocarbon composition" also includes materials which have undergone further processing step(s) after the synthesis step(s). Further processing steps can include but are not limited to distillation into distillate fractions and/or residual fractions, thermal cracking and/or catalytic cracking, solvent extraction, caustic treating, acid treating, dewaxing, and reforming among other processes. For example, a fraction of a Fischer-Tropsch synthesis can be treated like a crude oil or crude oil derivative and undergo further crude oil refining steps (thermal and/or catalytic cracking) among other processing steps.

DETAILED DESCRIPTION

The present invention relates to compositions comprising a hydrocarbon composition and an oxidized olefin wax which have a pour point lower than the pour point of the hydrocarbon composition alone. The present invention also relates to compositions comprising a hydrocarbon composition and an oxidized olefin wax which have an average wax particle size less than the average wax particle size of the hydrocarbon composition alone. The present invention also relates to a method of reducing the pour point and/or decreasing the average wax particle size of a hydrocarbon composition.

The hydrocarbon composition can generally be any composition comprising a hydrocarbon. In an embodiment, the hydrocarbon composition can comprise a crude oil, a crude oil distillate, a residual fuel, a residual oil, or a synthetic hydrocarbon composition. In other embodiments, the hydrocarbon composition can be a crude oil, a crude oil distillate, a residual fuel, a residual oil, or a synthetic hydrocarbon composition. In some embodiments, the hydrocarbon composition can be a crude oil; alternatively, a crude oil distillate; alternatively, a crude oil residual fuel; alternatively, a crude oil residual oil; or alternatively, a synthetic hydrocarbon composition. In some embodiments, the hydrocarbon composition can comprise crude oil, kerosene, diesel fuel, aviation fuel, jet fuel, burner oil, gas oil, fuel oil, light cycle oil, cleaning oil, hydraulic oils, a white oil, or a lubricating oil. In other embodiments, the hydrocarbon composition can be crude oil, kerosene, diesel fuel, aviation fuel, jet fuel, burner oil, gas oil, fuel oil, light cycle oil, cleaning oil, hydraulic oils, a white oil, or a lubricating oil. In yet other embodiments, the hydrocarbon composition can comprise crude oil, kerosene, diesel fuel, aviation fuel, jet fuel, or fuel oil. In yet other embodiments, the hydrocarbon composition can be crude oil, kerosene, diesel fuel, aviation fuel, jet fuel, or fuel oil. In further embodiments, the hydrocarbon composition can be crude oil; alternatively, kerosene; alternatively, diesel fuel; alternatively, aviation fuel; alternatively, jet fuel; or alternatively, fuel oil.

Generally, the hydrocarbon composition has a boiling point greater than 80° C. In an embodiment, the hydrocarbon composition can have a boiling point greater that 100° C.; or alternatively, greater than 120° C. In some embodiments, the hydrocarbon composition can boil within a range of 80° C. to 400° C.; or alternatively, 100° C. to 370° C. In other embodiments, the hydrocarbon composition can have a boiling point greater than 300° C.; alternatively, greater than 330° C.; or alternatively, greater than 360° C. In yet other embodiments, the hydrocarbon composition can boil within the range of 300° C. to 600° C.; or alternatively, with the range of 340° C. to 560° C. The boiling point information presented herein are provided as atmospheric pressure boiling points. While the boiling points are stated as an atmospheric boiling point, the hydrocarbon composition can be produced using any distillation pressure be it atmospheric pressure, subatmospheric pressure, or superatmospheric pressure. One skilled in the art can readily convert subatmospheric or superatmospheric pressure boiling point temperatures to atmospheric boiling point temperatures.

Generally, the hydrocarbon composition has a pour point greater than its desired and/or intended storage, transport, or use temperature. In an embodiment, the hydrocarbon composition can have a pour point greater than −30° C. In some embodiments, the hydrocarbon composition can have a pour point greater than −15° C.; alternatively, greater that 0° C.; alternatively, greater than 15° C.; or alternatively, greater that 30° C. In other embodiments, the hydrocarbon composition can have pour point ranging between −30° C. and 70° C.; alternatively, −15° C. and 60° C.; or alternatively, 0° C. and 45° C.

In an embodiment, the hydrocarbon composition can comprise waxy constituents which can precipitate from the hydrocarbon composition at a temperature greater than its desired and/or intended storage, transport, or use temperature. In some embodiments, the hydrocarbon composition can have a wax content greater than 1 weight percent. In other embodiments, the hydrocarbon composition can have a wax content greater than 2 weight percent; alternatively, greater than 3 weight; alternatively, greater than 5 weight percent; or alternatively, greater than 7.5 weight percent. In an embodiment, the hydrocarbon composition comprises waxy constituents which form wax precipitate particles having an average wax particle size greater than 50 microns.

In an aspect, the hydrocarbon composition generally has a pour point higher than the transport, storage, or use temperature of the hydrocarbon composition. Thus, one function of the oxidized olefin wax can be to decrease the pour point of the hydrocarbon composition such that the composition comprising the hydrocarbon composition and the oxidized olefin wax will have a pour point lower than the pour point of the hydrocarbon composition alone (a depressed pour point).

In another aspect, the hydrocarbon composition can form wax precipitate particles at a temperature higher than the transport, storage, or use of the hydrocarbon composition. Thus, another function of the oxidized olefin wax can be to reduce the average wax particle size in the hydrocarbon composition such that the composition comprising the hydrocarbon composition and the oxidized olefin wax has an average wax particle size smaller than the hydrocarbon composition alone at its transport, storage, or use temperature.

Generally, the composition comprising the hydrocarbon composition and the oxidized olefin wax comprises a sufficient concentration of oxidized olefin wax to decrease the pour point of the hydrocarbon composition and/or reduce the average wax particle size in the composition to a sufficient point to allow its storage transport or use at the desired conditions.

In an embodiment, the concentration of the oxidized olefin wax within the composition can range from 0.0005 to 2.0 weight percent. In other embodiments, the concentration of the oxidized olefin wax within the composition can range from 0.001 to 1.0 weight percent; alternatively, 0.001 to 0.5 weight percent; or alternatively, 0.005 to 0.25 weight percent. In an embodiment, the composition's pour point can be depressed by at least 0.5° C. In some embodiments, the composition's pour point can be depressed by at least 1° C.; alternatively, 3° C.; alternatively, 5° C.; alternatively, 7.5° C.; or alternatively, 10° C.

In an embodiment, the composition comprising the hydrocarbon composition and the oxidized olefin wax comprises wax precipitate particles having an average wax particle size of less than 50 microns. In some embodiments, the composition comprising the hydrocarbon composition and the oxidized olefin wax comprises wax precipitate particles having an average wax particle size ranging from 20 microns to 50 microns. In other embodiments, the composition comprising the hydrocarbon composition and the oxidized olefin wax comprises wax precipitate particles having an average wax particle size of less than 20 microns.

In addition to the hydrocarbon composition and the oxidized wax the compositions of the present invention can further contain other added materials. Often these additional materials are added to improve the transport, storage, or use properties of the hydrocarbon composition. For example, materials commonly added to crude oil, crude oil distillates, residual fuels, residual oils, and synthetic hydrocarbon compositions to improve the transport, storage, or use properties of the hydrocarbon composition can include one of more of the following materials; antioxidants, corrosion or rust inhibitors, haze inhibitors, foam inhibitors, dispersants, emulsifying agents, detergents, viscosity index improvers, extreme pressure agents, dyes, and/or dye stabilizers.

In an aspect, the present invention relates to a method of decreasing a pour point of a hydrocarbon composition comprising combining a hydrocarbon composition and an oxidized olefin wax. In another aspect, the present invention relates to a method of decreasing the average wax particle size in a hydrocarbon composition comprising combining a hydrocarbon composition and an oxidized olefin wax. In yet another aspect, the present invention relates to a method of decreasing the pour point of a hydrocarbon composition and decreasing the average wax particle size in a hydrocarbon composition comprising combining a hydrocarbon composition and an oxidized olefin wax.

The hydrocarbon composition and oxidized olefin are described herein and their embodiments are generally applicable to the method of decreasing the pour point of a hydrocarbon composition and/or decreasing the average wax particle size in a hydrocarbon composition. The hydrocarbon composition and oxidized olefin wax are typically combined in any quantity sufficient to decrease the pour point of the hydrocarbon composition and/or decrease the average wax particle size in the hydrocarbon to a sufficient extent to allow its storage transport or use at the desired conditions. The quantity of oxidized olefin wax, the reduction in the pour point, and the average wax particle size are described herein and are generally applicable to the method of decreasing the pour point of a hydrocarbon composition and/or decreasing the average wax particle size in a hydrocarbon composition.

In some instances, the oxidized olefin wax may not in a form that can be easily combined with the hydrocarbon composition. Alternatively, the amount of oxidized olefin wax may be too small to be accurately measured or metered to combine with the hydrocarbon composition. In these instances, or merely for convenience, the oxidized olefin wax can be dissolved, or dispersed in, a solvent to form an oxidized olefin wax concentrate.

Generally, the oxidized olefin wax concentrate comprises a solvent and an oxidized olefin wax. The solvent used for the oxidized olefin wax concentrate can be any solvent which can dissolve or uniformly disperse the oxidized olefin wax within the oxidized olefin wax concentrate. In some embodiments, the oxidized olefin concentrate solvent can be the hydrocarbon composition to which the oxidized olefin concentrate is to be combined. That is not to say that the hydrocarbon composition solvent has the exact composition as the hydrocarbon composition having its pour point decreased and/or its average wax particle size decreased, but the hydrocarbon concentrate solvent can have a similar composition. As a non-limiting example, one crude oil could be utilized as the solvent to form the oxidized olefin concentrate used to reduce the pour point of another crude oil, and/or decrease the average wax particle size in another crude oil. The hydrocarbon compositions are described herein and can be generally utilized as the solvent for the oxidized olefin wax concentrate. In some embodiments, the oxidized olefin wax concentrate solvent can be any liquid solvent having from 4 to 30 carbon atoms. In some embodiments, the solvent can be a liquid hydrocarbon having from 6 to 60 carbon atoms; alternatively, from 7 to 50 carbon atoms; alternatively, 8 to 40 carbon atoms; alternatively, 9 to 30 carbon atoms, or alternatively, 10 to 20 carbon atoms. The liquid hydrocarbon can be linear, branched, cyclic, alicyclic, or aromatic.

Generally, the concentration of the oxidized olefin wax within the oxidized olefin wax concentrate can be any concentration wherein the oxidized olefin wax is dissolved or uniformly dispersed within the oxidized olefin wax concentrate solution. Alternatively, the oxidized olefin wax concentration can be chosen to enable the accurate measurement or metering of the oxidized olefin wax to be combined with the hydrocarbon composition. In an embodiment, the oxidized olefin wax can comprise from 0.1 to 50 weight percent of the oxidized olefin wax concentrate. In some embodiments, the oxidized olefin wax concentration within the oxidized olefin wax concentrate can range from 1 to 45 weight percent; alternatively, 2 to 40 weight percent; or alternatively, 5 to 35 weight percent.

In an embodiment, the oxidized olefin wax concentrate can comprise other materials in addition to the solvent and the oxidized wax. Often these additional materials are added to improve the transport, storage, or use properties of the hydrocarbon composition. Materials which can be include in the oxidized olefin wax concentrate include one or more of the following materials; antioxidants, corrosion or rust inhibitors, haze inhibitors, foam inhibitors, dispersants, emulsifying agents, detergents, viscosity index improvers, extreme pressure agents, dyes, and/or dye stabilizers.

In an embodiment, the oxidized olefin wax can have an acid number ranging from 0.5 to 50 mg KOH/g oxidized olefin wax. In some embodiments, the oxidized olefin wax has an acid number ranging from 1 to 40 mg KOH/g oxidized olefin wax; alternatively, ranging from 2 to 30 mg KOH/g oxidized olefin wax; alternatively, ranging from 3 to 20 mg KOH/g oxidized olefin wax; or alternatively, ranging from 5 to 15 mg KOH/g oxidized olefin wax. In other embodiments, the oxidized olefin wax can have a saponification number ranging from 2 to 90 mg KOH/g oxidized olefin wax; alternatively, ranging from 5 to 75 mg KOH/g oxidized olefin wax; alternatively, ranging from 7.5 to 60 mg KOH/g oxidized olefin wax; or alternatively, ranging from 10 to 50 mg KOH/g oxidized olefin wax. Acid number values, when referred to herein, are measured according to ASTM D 974. Saponification numbers, when referred to herein, are measured according to ASTM D 94.

Generally, the oxidation of the olefin wax converts the carbon-carbon double bond (C=C) of the olefin wax into materials having a carbonyl group (carbon-oxygen double bond, C=O) among other groups. As such, the oxidized olefin wax capable of decreasing the pour point of a hydrocarbon composition and/or decreasing the average wax particle size in the hydrocarbon can contain both carbon-carbon double bonds and carbonyl groups. Thus, another parameter that can be utilized to describe the oxidized wax is the carbon-carbon double bond to carbonyl group ratio, C=C/C=O ratio, of the oxidized olefin wax.

The C=C/C=O ratio of the oxidized olefin wax can be measured by any convenient method known to those skilled in the art, e.g. NMR (nuclear magnetic resonance) or IR (infrared) spectroscopy, among others. A particularly convenient method of determining the C=C/C=O ratio is to measure of the IR peak area(s) of the C=C group(s) and the IR peak area(s) of the C=O group(s) and calculate the C=C/C=O ratio using the total IR C=C peak area and IR C=O peak area. In an embodiment, the oxidized olefin wax has a C=C/C=O ratio less that 3. In some embodiments, the oxidized olefin wax has a C=C/C=O ratio less that 2; alternatively, less than 1; or alternatively, less than 0.5. In other embodiments, the oxidized olefin wax has a C=C/C=O ratio ranging from 0.01 to 3; alternatively, ranging from 0.015 to 2; alternatively, ranging from 0.02 to 1; or alternatively, ranging from 0.025 to 0.5.

Generally, the olefin wax utilized to produce the oxidized olefin wax can be any composition comprising an olefin wax having at least 20 carbon atoms. Further independent properties that can be utilized to describe the olefin wax from which the oxidized olefin wax is prepared include the olefin content of the olefin wax, the olefin wax carbon number composition, olefin wax average molecular weight, the types of olefins present in the olefin wax (alpha olefin, linear alpha olefin, vinylidene olefin, internal olefin, and linear internal olefin), and the content of the olefin types present within the olefin wax.

In an embodiment, the oxidized olefin wax can be produced from an olefin wax comprising greater than 75 mole percent olefins; alternatively, greater than 85 mole percent olefins; alternatively, greater than 90 mole percent olefins; or alternatively, greater than 95 mole percent olefins. In other embodiments, the oxidized olefin wax can be produced from an olefin wax that consists essentially of olefins. The olefin wax can contain some saturated paraffin wax and still be capable of decreasing the pour point of a hydrocarbon composition and/or decreasing the average wax particle size of a hydrocarbon composition. In some embodiments, the olefin wax contains less than 25 mole percent saturated paraffin wax; alternatively, less than 15 mole percent saturated paraffin wax; alternatively, less than 10 mole percent saturated paraffin wax; or alternatively, less than 5 mole percent saturated paraffin wax.

In an embodiment, the oxidized olefin wax is produced from an olefin wax having a proportion of waxes within a certain carbon number range. In some embodiments, the olefin wax can comprise greater than 70 weight percent olefins having from 20 to 24 carbon atoms; alternatively, greater than 80 weight percent olefins having from 20 to 24 carbon atoms; alternatively, greater than 85 weight percent olefins having from 20 to 24 carbon atoms; alternatively, greater than 90 weight percent olefins having from 20 to 24 carbon atoms; or alternatively, greater than 95 weight percent olefins having from 20 to 24 carbon atoms. In other embodiments, the olefin wax can comprise greater than 50 weight percent olefins having from 24 to 28 carbon atoms; alternatively, greater than 60 weight percent olefins having from 24 to 28 carbon atoms; alternatively, greater than 70 weight percent olefins having from 24 to 28 carbon atoms; alternatively, greater than 80 weight percent olefins having from 24 to 28 carbon atoms; or alternatively, greater than 90 weight percent olefins having from 24 to 28 carbon atoms. In yet other embodiments, the olefin wax can comprise greater than 50 weight percent olefins having from 26 to 28 carbon atoms; alternatively, greater than 60 weight percent olefins having from 26 to 28 carbon atoms; alternatively, greater than 70 weight percent olefins having from 26 to 28 carbon atoms; alternatively, greater than 80 weight percent olefins having from 26 to 28 carbon atoms; or alternatively, greater than 90 weight percent olefins having from 26 to 28 carbon atoms. In yet further embodiments, the olefin wax can comprise greater than 70 weight percent olefins having at least 30 carbon atoms; alternatively, greater than 80 weight percent olefins having at least 30 carbon atoms; alternatively, greater than 85 weight percent olefins having from at least 30 carbon atoms; alternatively, greater than 90 weight percent olefins having at least 30 carbon atoms; or alternatively, greater than 95 weight percent olefins having at least 30 carbon atoms.

Alternatively, the oxidized olefin wax can be produced from an olefin wax having a particular average molecular weight. In an embodiment, the olefin wax has an average olefin molecular weight greater than 260 grams/mole. In some embodiment, the olefin wax has an average olefin molecular weight greater than 330 grams/mole. In another embodiments, the olefin wax has an average olefin molecular weight greater than 400 grams/mole. In an embodiment, the olefin wax has an average molecular weight ranging from 260 grams/mole to 1000 grams/mole; alternatively, ranging from 260 grams/mole to 750 grams/mole; or alternatively, ranging from 260 grams/mole to 550 grams/mole. In some embodiments, the olefin wax has an average olefin molecular weight ranging from 260 grams/mole to 340 grams/mole; alternatively, ranging from 280 grams/mole to 320 grams/mole; or alternatively, ranging from 290 grams/mole to 310 grams/mole. In another embodiment, the olefin wax has an average olefin molecular weight ranging from 330 grams/mole to 420 grams/mole; alternatively, ranging from 350 grams/mole to 400 grams/mole; or alternatively, ranging from 360 grams/mole to 390 grams/mole. In yet another embodiment, the olefin wax has an average olefin molecular weight ranging from 440 grams/mole to 550 grams/mole; alternatively, ranging from 460 grams/mole to 530 grams/mole; or alternatively, ranging from 480 grams/mole to 510 grams/mole.

Generally, an olefin is a hydrocarbon with at least one carbon-carbon double bond. There are several types of olefins which can comprise the olefin wax. These types of olefins can include an alpha olefin, a linear alpha olefin, a vinylidene, an internal olefin, and a linear internal olefin among others. An alpha olefin is a hydrocarbon with a carbon-carbon double bond at the terminal position. The term alpha olefin includes a linear alpha olefin and a vinylidene. A linear alpha olefin is an alpha olefin having a straight chain of carbon atoms (i.e. no carbon chain branches) and a carbon-carbon double bond at the terminal position. The term normal alpha olefin is synonymous with linear alpha olefin. A vinylidene is a 2,2-disubstituted olefin (2,2-disubstituted alpha olefin, a non-linear alpha olefin). An internal olefin is an olefin having a double bond at an internal position.

In an embodiment, the oxidized olefin wax can be produced from an olefin wax comprising an alpha olefin wax, a linear alpha olefin wax, a vinylidene wax, an internal olefin, a linear internal olefin wax, or any combination thereof. In some embodiments, the olefin wax can comprise an alpha olefin wax; alternatively, a linear alpha olefin wax; alternatively, a vinylidene wax; alternatively, an internal olefin wax; or alternatively, a linear internal olefin wax. Thus, in an embodiment, the oxidized olefin wax can comprise an oxidized alpha olefin wax; alternatively, an oxidized linear alpha olefin wax; alternatively, an oxidized vinylidene wax; alternatively, an oxidized internal olefin wax; or alternatively, an oxidized linear internal olefin wax. In other embodiments, the oxidized olefin wax can be an oxidized alpha olefin wax; alternatively, an oxidized linear alpha olefin wax; alternatively, an oxidized vinylidene wax; alternatively, an oxidized internal olefin wax; or alternatively, an oxidized linear internal olefin wax.

In an embodiment, the olefin wax can comprise alpha olefins. In some embodiments, the olefins wax can comprise greater than 30 mole percent alpha olefins. In other embodiments, the olefins of the olefin wax comprises greater than 45 mole percent alpha olefins; alternatively greater than 60 mole percent alpha olefins; alternatively, greater than 75 mole percent alpha olefins; alternatively, greater than 90 mole percent alpha olefins; or alternatively, greater than 95 mole percent alpha olefins. In yet other embodiments, the olefin wax can comprise from 50 to 99 mole percent alpha olefins; alternatively, 55 to 98 mole percent alpha olefins; alternatively, 60 to 97 mole percent alpha olefins; or alternatively, from 65 to 95 mole percent alpha olefins.

In an embodiment, the olefin wax can comprise linear alpha olefins. In some embodiments, the olefins of the olefin wax can comprise greater than 30 mole percent linear alpha olefins; greater than 45 mole percent linear alpha olefins; alternatively, greater than 60 mole percent linear alpha olefins; or alternatively, greater than 75 mole percent linear alpha olefins. In other embodiments, the olefin wax can comprise from 30 to 99 mole percent linear alpha olefins; alternatively, from 40 to 95 mole percent linear alpha olefins; or alternatively, from 50 to 90 mole percent linear alpha olefins.

In an embodiment, the olefin wax can comprise vinylidenes. In some embodiments, the olefins of the olefin wax can comprise from 2 to 80 mole percent vinylidenes. In other embodiments, the olefins of the olefin wax can comprise from 4 to 70 mole percent vinylidenes; or alternatively, 6 to 60 mole percent vinylidenes.

In an embodiment, the olefin wax can be a commercially available olefin wax. Known olefin waxes include olefin streams from ethylene oligomerization, cracked heavy waxes (e.g. Fischer-Tropsch waxes), and mixtures of paraffins and olefins, among others. Additionally, the olefin wax can include Fischer-Tropsch waxes comprising a mixture of paraffin waxes and olefin waxes which meet the olefin wax compositions described herein. One source of commercially available Fischer-Tropsch waxes is Sasol, Johannesburg, South Africa.

In an embodiment, the olefin wax can comprise a commercially available normal alpha olefin wax. In some embodiments, the olefin wax composition consists essentially of commercially available normal alpha olefin waxes. One source of commercially available normal alpha olefin waxes is Chevron Phillips Chemical Company LP, The Woodlands, Tex. Table 1 provides published physical and chemical characteristics of the normal alpha olefin waxes Alpha Olefin $C_{20-24}$, Alpha Olefin $C_{24-28}$, Alpha Olefin $C_{26-28}$, Alpha Olefin $C_{30+}$, and Alpha Olefin $C_{30+HA}$, which are provided for illustrative purposes as exemplary olefin waxes. The invention is not limited to these particular feedstock olefin waxes.

Generally, the oxidized olefin wax can be produced using any set of oxidation conditions capable of producing the oxidized wax having the herein described properties from an olefin wax. The olefin wax and the oxidized olefin wax composition properties are described herein and are generally applicable to the process to produce the oxidized olefin wax.

Generally, the oxidized olefin wax can be produced by contacting an olefin wax with an oxygen-containing gas. Additional process parameters which can be used to describe the process to produce the oxidized olefin waxes can include the oxygen content of the oxygen-containing gas and/or the flow rate of the oxygen-containing gas, the temperature at which the olefin wax and oxygen-containing gas are contacted, the time for which the oxygen-containing gas and the olefin wax are contacted, and whether or not the olefin wax is mixed,

TABLE 1

Typical Properties of Commercial Normal Alpha Olefin Waxes

| | Typical Value (Typical Range) | | | | |
|---|---|---|---|---|---|
| Characteristic | Alpha Olefin $C_{20\text{-}24}$ | Alpha Olefin $C_{24\text{-}28}$ | Alpha Olefin $C_{26\text{-}28}$ | Alpha Olefin $C_{30+}$ | Alpha Olefin $C_{30+HA}$ |
| % Alpha olefins | 86 | 54 | 79 | 62 | 76 |
| ($^1$H-NMR) | (83- 92) | (40- 60) | (70- 82) | (50- 65) | (70- 81) |
| % Vinylidenes | 8 | 30 | 16 | 30 | 18 |
| ($^1$H-NMR) | (6- 15) | (25- 55) | (11- 17) | (25- 45) | (15- 25) |
| % Internal olefins | 3 | 18 | 3 | 10 | 5.3 |
| ($^1$H-NMR) | (2- 5) | (10- 22) | (2- 8) | (5- 20) | (4- 10) |
| Drop melt point, ° F. (ASTM D 127) | 96* | 154 | 125 | 164 | 150 |
| Needle Penetration @ 77° F., dmm | 150 | 59 | 48 | 13 | 15.5 |
| Flash Point (ASTM D 93) | 362° F. (183° C.) | 425° F. (218° C.) | 417° F. (214° C.) | 485° F. (252° C.) | 432° F. (222° C.) |
| Saybolt Color | 30 | 25 | 30 | 20+ | 20+ | stirred, or agitated during contact with the oxygen-containing gas. These independently variable process parameters are further described herein.

The oxygen-containing gas can be any gas containing oxygen. The oxygen-containing gas can be pure oxygen, oxygen diluted with an inert gas, air, or air diluted with an inert gas, among others. Nitrogen and noble gases may be referred to herein as "inert gases." Exemplary mixtures of oxygen diluted with an inert gas or gases include, but are not limited to, mixtures of oxygen and a noble gases, mixtures of oxygen and nitrogen, mixtures of oxygen and argon, or mixtures of oxygen, nitrogen, and argon, among others. In one embodiment, all gases other than oxygen in the mixture are selected from nitrogen or noble gases. In an embodiment, the oxygen-containing gas can comprise less than 50 percent oxygen. In a further embodiment, the oxygen-containing gas can comprise less than 22 percent oxygen. In another embodiment, the oxygen-containing gas is air.

The contacting of the olefin wax and the oxygen-containing gas can involve any technique known to the skilled artisan. Such techniques can include, but are not limited to, sparging the gas through the melted olefin wax (with or without mixing, stirring, or other agitation of the melted wax) or providing the oxygen-containing gas to the surface of the melted wax with or without mixing, stirring, or other agitation of the melted feedstock olefin wax composition, among others.

The contacting step can be performed in the presence or absence of a catalyst. In some embodiments, the contacting step is performed in the absence of an added catalyst. In other embodiments, the contacting step can be performed in the presence of a catalyst. In the catalytic embodiments, the catalyst may comprise manganese or cobalt, among others.

Generally, the process to produce the oxidized olefin wax comprises contacting the olefin wax with an oxygen-containing gas at a temperature greater than the melting point of the olefin wax. In an embodiment, the temperature of the contacting step to produce the oxidized olefin wax composition can be between the olefin wax melting point and 300° C. In some embodiments, the contacting step can be performed at a temperature between 80° C. and 300° C. In other embodiments, the contacting step can be performed at a temperature between 80° C. and 200° C.; alternatively, between 90° C. and 180° C.; alternatively, between 100° C. and 160° C.; or alternatively, between 110° C. and 150° C.

In an embodiment, the contacting step for producing the oxidized olefin wax comprises contacting air with the olefin wax at an air flow rate greater than 0.1 CFH/kg olefin wax. In some embodiments, the air flow rate is between 0.1 CFH/kg olefin wax and 30 CFH/kg olefin wax. In other embodiments, the air flow rate is between 0.5 CFH/kg olefin wax and 20 CFH/kg olefin wax; alternatively, between 1.0 CFH/kg olefin wax and 15 CFH/kg olefin wax; alternatively, between 1.5 CFH/kg olefin wax and 12 CFH/kg olefin wax; or alternatively, between 2 CFH/kg olefin wax and 10 CFH/kg olefin wax.

In some embodiments, the contacting step for the process for producing an oxidized olefin wax composition can have a duration between 1 minute and 48 hours. In another embodiment, the duration is between 2 hours and 30 hours. In yet another embodiment, the duration is between 4 hours and 24 hours.

In a separate embodiment, the contacting step for producing the oxidized olefin wax is performed at a low air flow. In this low flow embodiment, the contacting step comprises contacting air with the olefin wax at an air flow rate less than 0.1 CFH/kg olefin wax and without substantial agitation of the olefin wax. In this embodiment, the duration of the contacting step can be greater than 1 day.

The contacting step yields an oxidized olefin wax, which may further comprise other compounds, such as volatile compounds. In one embodiment, the process can further comprise removing volatile compounds from the oxidized olefin wax by one or more of vacuum, heat, nitrogen sparging, or contacting with activated charcoal, clay, alumina, or two or more thereof.

In an embodiment, the oxidized olefin wax can be devolatilized by transfer to an appropriate vessel and connecting the vessel to a vacuum apparatus, such as a Kugelrohr rotovap apparatus consisting an air oven, a vacuum pump, and a rotating mechanism to effect a thin film evaporation function (manufactured by Barnstead International and distributed by Aldrich, Model No. Z40-115-3). The volatiles can be stripped off by a combination of vacuum (less than 5 mmHg) and heat, such as maintaining the oven temperature from about 140° C. to about 220° C. for a duration from about 1 hr to about 12 hr, such as 3 hr.

In another embodiment, the oxidized olefin wax can be devolatilized by applying a vacuum to a vessel comprising the oxidized olefin wax. In yet another embodiment, the oxidized olefin wax can be devolatilized by applying a vacuum and heat to a vessel comprising the oxidized olefin wax composition. In still another embodiment, the oxidized olefin wax can be mixed, stirred, or agitated during the vacuum devolatilization step. In other embodiments, a sparging gas is passed through the oxidized olefin wax during the vacuum devolatilization step. The sparging gas can be an inert gas such as nitrogen, argon, or combinations thereof. In yet another embodiment, the vacuum devolatilization step may be performed using a wiped film evaporator. In some embodiments, two or more of heat, agitation, sparging, and wiped film evaporation can be applied during vacuum devolatilization.

The following examples are included to demonstrate specific embodiments of the invention. Those of skill in the art should appreciate that the techniques disclosed in the examples represent techniques discovered to function well in the practice of the invention. However, in light of the present disclosure, those of skill in the art should will appreciate the changes that can be made in the specific disclosed embodiments and still obtain similar results that do not depart from the spirit and scope of the invention.

EXAMPLES

In examples 1-13, normal alpha olefin waxes were oxidized under different oxidation conditions. The properties of the normal alpha olefin waxes prior to the oxidation are provided in Table 2. The properties of the oxidized normal alpha olefin waxes are provided in Table 3.

TABLE 2

Properties of Normal Alpha Olefin Waxes

| Feed Stock | Needle Penetration Number at 25° C. (dmm) | Saponification Number (mg KOH/g) | Acid Number (mg KOH/g) | Viscosity at 100° C. (cSt) | Drop Melt Point (° C.) |
|---|---|---|---|---|---|
| Alpha Olefin $C_{30+}$ | 13 | <0.5 | <0.2 | 7.3 | 77 |
| Alpha Olefin $C_{30+HA}$ | 14 | <0.5 | <0.2 | 7 | 71 |
| Alpha Olefin $C_{26-28}$ | 45 | <0.5 | <0.2 | 3.4 | 51 |
| Alpha Olefin $C_{24-28}$ | 59 | <0.5 | <0.2 | 2.5 | 63 |
| Alpha Olefin $C_{20-24}$ | 150 | <0.5 | <0.2 | 2.1 | 36 |

Example 1

Alpha Olefin $C_{30+}$ (Chevron Phillips Chemical Company LP), 500 g, was placed into a four-neck flask equipped with a heating mantle, a thermocouple, a single blade agitator, an air sparger (cylindrical, 1" in length and 3/8" in diameter, average pore size 15 μm), and a side arm connected to a receiving flask. The wax was heated to 130° C. and the agitation was set at 400 rpm. Then a steady stream of air was introduced at 1.7 CFH. The reaction was maintained at 130° C. for 24 hours. The contents were allowed to cool to 100° C. and were discharged. The resulting material appeared as a white to light yellow solid. The properties of the oxidized Alpha Olefin $C_{30+}$ are provided in Table 3.

Example 2

Alpha Olefin $C_{30+HA}$ (Chevron Phillips Chemical Company LP), 500 g, was placed into a four-neck flask, equipped with a heating mantle, a thermocouple, a single blade agitator, an air sparger (cylindrical, 1" in length and 3/8" in diameter, average pore size 15 μm), and a side arm connected to a receiving flask. The wax was heated to 130° C. and the agitation was set at 400 rpm. Then a steady stream of air was introduced at 1.7 CFH. The reaction was maintained at 130° C. for 24 hours. The contents were allowed to cool to 100° C. and were discharged. The resulting material appeared as a white to light yellow solid. The properties of the oxidized Alpha Olefin $C_{30+HA}$ are provided in Table 3.

Example 3

Alpha Olefin $C_{30+}$ (Chevron Phillips Chemical Company LP), 500 g, was placed into a four-neck flask equipped with a heating mantle, a thermocouple, a single blade agitator, an air sparger (cylindrical, 1" in length and 3/8" in diameter, average pore size 15 μm), and a side arm connected to a receiving flask. The wax was heated to 145° C. and the agitation was set at 400 rpm. Then a steady stream of air was introduced at 3.4 CFH. The reaction was maintained at 145° C. for 8 hours. The contents were allowed to cool to 100° C. and were discharged. The resulting material appeared as a white solid. The properties of the oxidized Alpha Olefin $C_{30+}$ are provided in Table 3.

Example 4

Alpha Olefin $C_{30+HA}$ (Chevron Phillips Chemical Company LP), 500 g, was placed into a four-neck flask equipped with a heating mantle, a thermocouple, a single blade agitator, an air sparger (cylindrical, 1" in length and 3/8" in diameter, average pore size 15 μm), and a side arm connected to a receiving flask. The wax was heated to 145° C. and the agitation was set at 400 rpm. Then a steady stream of air was introduced at 3.4 CFH. The reaction was maintained at 145° C. for 8 hours. The contents were allowed to cool to 100° C. and were discharged. The resulting material appeared as a white solid. The properties of the oxidized Alpha Olefin $C_{30+HA}$ are provided in Table 3.

Example 5

Alpha Olefin $C_{26-28}$ (Chevron Phillips Chemical Company LP), 500 g, was placed into a four-neck flask equipped with a heating mantle, a thermocouple, a single blade agitator, an air sparger (cylindrical, 1" in length and 3/8" in diameter, average pore size 15 μm), and a side arm connected to a receiving flask. The wax was heated to 145° C. and the agitation was set at 400 rpm. Then a steady stream of air was introduced at 3.4 CFH. The reaction was maintained at 145° C. for 8 hours. The contents were allowed to cool to 100° C. and were discharged. The resulting material appeared as a white solid. The properties of the oxidized Alpha Olefin $C_{26-28}$ are provided in Table 3.

Example 6

Alpha Olefin $C_{30+}$ (Chevron Phillips Chemical Company LP), 500 g, was placed into a four-neck flask equipped with a heating mantle, a thermocouple, a single blade agitator, an air sparger (cylindrical, 1" in length and 3/8" in diameter, average pore size 15 μm), and a side arm connected to a receiving flask. The wax was heated to 145° C. and the agitation was set at 400 rpm. Then a steady stream of air was introduced at 3.4 CFH. The reaction was maintained at 145° C. for 24 hours. The contents were allowed to cool to 100° C. and were discharged. The resulting material appeared as a yellow solid. The properties of the oxidized Alpha Olefin $C_{30+}$ are provided in Table 3.

Example 7

Alpha Olefin $C_{30+HA}$ (Chevron Phillips Chemical Company LP), 500 g, was placed into a four-neck flask equipped with a heating mantle, a thermocouple, a single blade agitator, an air sparger (cylindrical, 1" in length and 3/8" in diameter, average pore size 15 μm), and a side arm connected to a receiving flask. The wax was heated to 145° C. and the agitation was set at 400 rpm. Then a steady stream of air was introduced at 3.4 CFH. The reaction was maintained at 145° C. for 24 hours. The contents were allowed to cool to 100° C. and were discharged. The resulting material appeared as a white solid. The properties of the oxidized Alpha Olefin $C_{30+HA}$ are provided in Table 3.

Example 8

Alpha Olefin $C_{26-28}$ (Chevron Phillips Chemical Company LP), 500 g, was placed into a four-neck flask equipped with a heating mantle, a thermocouple, a single blade agitator, an air sparger (cylindrical, 1" in length and 3/8" in diameter, average pore size 15 μm), and a side arm connected to a receiving flask. The wax was heated to 145° C. and the agitation was set at 400 rpm. Then a steady stream of air was introduced at 3.4 CFH. The reaction was maintained at 145° C. for 24 hours. The contents were allowed to cool to 100° C. and were discharged. The resulting material appeared as a white solid. The properties of the oxidized Alpha Olefin $C_{26-28}$ are provided in Table 3.

Example 9

Alpha Olefin $C_{30+}$ (Chevron Phillips Chemical Company LP), 500 g, was placed into a four-neck flask equipped with a heating mantle, a thermocouple, a single blade agitator, an air sparger (cylindrical, 1" in length and 3/8" in diameter, average pore size 15 μm), and a side arm connected to a receiving flask. The wax was heated to 145° C. and then a steady stream of air was introduced at 3.4 CFH. The reaction was maintained at temperature 145° C. for 24 hours. The contents were allowed to cool to 100° C. and were discharged. The resulting material appeared as a yellow solid. The properties of the oxidized Alpha Olefin $C_{30+}$ are provided in Table 3.

Example 10

Alpha Olefin $C_{30+HA}$ (Chevron Phillips Chemical Company LP), 500 g, was placed into a four-neck flask equipped with a heating mantle, a thermocouple, a single blade agitator, an air sparger (cylindrical, 1" in length and 3/8" in diameter, average pore size 15 μm), and a side arm connected to a receiving flask. The wax was heated to 145° C. and then a steady stream of air was introduced at 3.4 CFH. The reaction was maintained at temperature 145° C. for 24 hours. The contents were allowed to cool to 100° C. and were discharged. The resulting material appeared as a yellow solid. The properties of the oxidized Alpha Olefin $C_{30+HA}$ are provided in Table 3.

Example 11

Alpha Olefin $C_{26-28}$ (Chevron Phillips Chemical Company LP), 500 g, was placed into a four-neck flask equipped with a heating mantle, a thermocouple, a single blade agitator, an air sparger (cylindrical, 1" in length and 3/8" in diameter, average pore size 15 μm), and a side arm connected to a receiving flask. The wax was heated to 145° C. and then a steady stream of air was introduced at 3.4 CFH. The reaction was maintained at temperature 145° C. for 24 hours. The contents were allowed to cool to 100° C. and were discharged. The resulting material appeared as a yellow solid. The properties of the oxidized Alpha Olefin $C_{26-28}$ are provided in Table 3.

Example 12

Alpha Olefin $C_{24-28}$ (Chevron Phillips Chemical Company LP), 500 g, was placed into a four-neck flask equipped with a heating mantle, a thermocouple, a single blade agitator, an air sparger (cylindrical, 1" in length and 3/8" in diameter, average pore size 15 μm), and a side arm connected to a receiving flask. The wax was heated to 145° C. and then a steady stream of air was introduced at 3.4 CFH. The reaction was maintained at temperature 145° C. for 24 hours. The contents were allowed to cool to 100° C. and were discharged. The resulting material appeared as a yellow solid. The properties of the oxidized Alpha Olefin $C_{24-28}$ are provided in Table 3.

Example 13

Alpha Olefin $C_{20-24}$ (Chevron Phillips Chemical Company LP), 500 g, was placed into a four-neck flask equipped with a heating mantle, a thermocouple, a single blade agitator, an air sparger (cylindrical, 1" in length and 3/8" in diameter, average pore size 15 μm), and a side arm connected to a receiving flask. The wax was heated to 145° C. and then a steady stream of air was introduced at 3.4 CFH. The reaction was maintained at temperature 145° C. for 24 hours. The contents were allowed to cool to 100° C. and were discharged. The resulting material appeared as a yellow solid. The properties of the oxidized Alpha Olefin $C_{20-24}$ are provided in Table 3.

TABLE 3

Normal Alpha Olefin Wax Oxidation Conditions and Properties of the Oxidized Normal Alpha Olefin Waxes for Examples 1- 13.

| | | Oxidation Conditions | | | Oxidized Wax Properties |
| --- | --- | --- | --- | --- | --- |
| Example | Feed Stock | Temperature (° C.) | Time (hours) | Flow Rate (CFU/kg) | Needle Penetration (dmm) |
| 1 | Alpha Olefin $C_{30+}$ | 130 | 24 | 3.4 | 6 |
| 2 | Alpha Olefin $C_{30+HA}$ | 130 | 24 | 3.4 | 13 |

TABLE 3-continued

Normal Alpha Olefin Wax Oxidation Conditions and Properties of
the Oxidized Normal Alpha Olefin Waxes for Examples 1- 13.

| 3  | Alpha Olefin $C_{30+}$      | 145 | 8  | 6.8 | 12 |
|----|------------------------------|-----|----|-----|----|
| 4  | Alpha Olefin $C_{30+HA}$     | 145 | 8  | 6.8 | 14 |
| 5  | Alpha Olefin $C_{26-28}$     | 145 | 8  | 6.8 | 33 |
| 6  | Alpha Olefin $C_{30+}$       | 145 | 24 | 6.8 | 20 |
| 7  | Alpha Olefin $C_{30+HA}$     | 145 | 24 | 6.8 | 14 |
| 8  | Alpha Olefin $C_{26-28}$     | 145 | 24 | 6.8 | 55 |
| 9  | Alpha Olefin $C_{30+}$       | 145 | 24 | 3.4 | —  |
| 10 | Alpha Olefin $C_{30+HA}$     | 145 | 24 | 3.4 | —  |
| 11 | Alpha Olefin $C_{26-28}$     | 145 | 24 | 3.4 | —  |
| 12 | Alpha Olefin $C_{24-28}$     | 145 | 24 | 3.4 | 34 |
| 13 | Alpha Olefin $C_{20-24}$     | 145 | 24 | 3.4 | —  |

| | Oxidized Wax Properties | | | |
|---|---|---|---|---|
| Example | Saponification Number (mg KOH/g) | Acid Number (mg KOH/g) | Viscosity at 100° C. (cSt) | Drop Melt Point (° C.) |
| 1  | 45  | 15   | 16.6 | 74 |
| 2  | 50  | 17   | 13.3 | 71 |
| 3  | 97  | 37   | 25   | 74 |
| 4  | 68  | 28   | 22.8 | 70 |
| 5  | 91  | 40   | 15.5 | 60 |
| 6  | 150 | 46   | 70.5 | 70 |
| 7  | 136 | 44   | 65.9 | 68 |
| 8  | 177 | 40   | 56.3 | 55 |
| 9  | —   | 30.3 | —    | —  |
| 10 | —   | 30.3 | —    | —  |
| 11 | —   | 39.8 | —    | —  |
| 12 | 50  | 14   | —    | —  |
| 13 | —   | —    | —    | —  |

Examples 14-24

The oxidized normal alpha olefin waxes of examples 9-13 were evaluated as potential pour point depressants by determining the effect the oxidized normal alpha olefin wax had on the pour point and the average wax particle size of the wax precipitate particles of a crude oil distillate simulant. The pour point depressant tests were performed by combining the crude oil distillate simulant and the oxidized normal alpha olefin wax, heating the solution in an oven to 40° C. (104° F.), and then allowing the solution to cool to room temperature. As the pour point depressant test solution cooled, the pour point was periodically evaluated by placing the flask at a 45 degree angle. The highest temperature at which the pour point depressant test solution did not flow was taken to be the pour point. The average wax particle size in the crude oil distillate simulant was measured by SEM (scanning electron microscopy). Test pour point depressant solution containing greater than 500 ppm oxidized normal alpha olefin wax were prepared by directly adding the test oxidized normal alpha olefin wax to the crude oil distillate simulant. Test pour point depressant solution containing less than 500 ppm oxidized normal alpha olefin wax were prepared by combining a stock solution of the oxidized normal alpha olefin wax in ortho-xylene and a crude oil distillate simulant.

Crude oil distillate simulants were comprised of 95 grams tridecane and 5 grams of 60° C. (140° F.) melting paraffin wax. The crude oil distillate simulant were prepared by combining the tridecane and the paraffin wax and heating the simulant in an oven at 60° C. until the paraffin wax was dissolved within the tridecane.

Stock oxidized normal alpha olefin wax solutions were comprised of approximately 0.01 grams of an oxidized normal alpha olefin wax from examples 9-13 and 10 grams of ortho-xylene. The stock oxidized alpha olefin wax solutions were prepared by combining the oxidized normal alpha olefin wax and the ortho-xylene and heating the solution in an oven at 43° C. until the oxidized normal alpha olefin wax was completely dissolved. Similar solutions of Alpha Olefin $C_{30+}$ (unoxidized) and Alpha Olefin $C_{30+HA}$ (unoxidized) were prepared in the same manner.

Example 14 represents a control experiment that determined the pour point of the crude oil distillate simulant and the average wax particle size in the crude oil distillate simulant in the absence of the oxidized normal alpha olefin wax. Examples 15 and 16 represent comparative experiments that determined the effect that Alpha Olefin $C_{30+}$ and Alpha Olefin $C_{30+HA}$ had on the pour point of the crude oil distillate simulant and the average wax particle size in the crude oil distillate simulant. Examples 17-24, determined the effect that the oxidized normal alpha olefin waxes of examples 9-13 had on the pour point of the crude oil distillate simulant and the average wax particle size in the crude oil distillate simulant. The results of pour point depressant evaluation of the oxidized normal alpha olefin waxes of examples 9-13 are provided in Table 4.

TABLE 4

Pour Point Depression in a Crude Oil Distillate Simulant using Oxidized Normal Alpha Olefin Waxes - Examples 14-24

| Example | Crude Oil Distillate Simulant Solution | | Pour Point Depressant | | |
|---|---|---|---|---|---|
| | Wax Simulant | Quantity of Wax Simulant | Pour Point Depressant | Acid Number | Saponification Number |
| 14 | 60° C. wax | 5 wt. % | — | — | — |
| 15 | 60° C. wax | 5 wt. % | Alpha Olefin $C_{30+}$ | <0.5 | <0.2 |
| 16 | 60° C. wax | 5 wt. % | Alpha Olefin $C_{30+HA}$ | <0.5 | <0.2 |
| 17 | 60° C. wax | 5 wt. % | Oxidized Alpha Olefin $C_{30+HA}$ | 30.3 | — |
| 18 | 60° C. wax | 5 wt. % | Oxidized Alpha Olefin $C_{26-28}$ | 39.8 | — |
| 19 | 60° C. wax | 5 wt. % | Oxidized Alpha Olefin $C_{30+HA}$ | 30.3 | — |
| 20 | 60° C. wax | 5 wt. % | Oxidized Alpha Olefin $C_{30+}$ | 30.3 | — |
| 21 | 60° C. wax | 5 wt. % | Oxidized Alpha Olefin $C_{20-24}$ | — | — |
| 22 | 60° C. wax | 5 wt. % | Oxidized Alpha Olefin $C_{30+HA}$ | 30.3 | — |
| 23 | 60° C. wax | 5 wt. % | Oxidized Alpha Olefin $C_{24-28}$ | 14 | 50 |
| 24 | 60° C. wax | 5 wt. % | Oxidized Alpha Olefin $C_{24-28}$ | 14 | 50 |

| Example | Pour Point Depressant Quantity of Pour Point Depressant | Treated Crude Oil Distillate Parameters | | |
|---|---|---|---|---|
| | | Pour Point | Pour Point Reduction | Average wax Particle Size |
| 14 | — | 25° C. | — | >50 microns |
| 15 | 1,195 ppm | 25° C. | 0° C. | >50 microns |
| 16 | 1,090 ppm | 25° C. | 0° C. | >50 microns |
| 17 | 10,000 ppm | 24° C. | 1° C. | <50 microns |
| 18 | 100 ppm | 25° C. | — | >50 microns |
| 19 | 100 ppm | 24° C. | 1° C. | 20-50 microns |
| 20 | 100 ppm | 22° C. | 3° C. | ~20 microns |
| 21 | 100 ppm | 22° C. | 3° C. | — |
| 22 | 1,000 ppm | 24° C. | 1° C. | 20-50 microns |
| 23 | 1,000 ppm | 20° C. | 5° C. | <20 microns |
| 24 | 100 ppm | 19° C. | 6° C. | <20 microns |

Example 25

Alpha Olefin $C_{24-28}$ (Chevron Phillips Chemical Company LP), 500 g, was placed into a four-neck flask equipped with a heating mantle, a thermocouple, a single blade agitator, an air sparger (cylindrical, 1" in length and ⅜" in diameter, average pore size 15 μm), and a side arm connected to a receiving flask. The wax was heated to 145° C. and then a steady stream of air was introduced at 3.4 CFH. The reaction was maintained at temperature 145° C. for 7.5 hours. A sample of the oxidized normal alpha olefin wax $C_{24-28}$ was taken and set aside for property evaluation and pour point depressant evaluation. The remainder of the reaction was maintained at 145° C. for an additional 16.5 hours. The contents were allowed to cool to 100° C. and were discharged. The resulting material appeared as a yellow solid. The properties of the two oxidized Alpha Olefin $C_{24-28}$ samples are provided in Table 5.

Examples 26-37

The 7.5 hour oxidized Alpha Olefin $C_{24-28}$ sample of example 25 and the 24 hour oxidized Alpha Olefin $C_{24-28}$ sample of example 25 were evaluated as potential pour point depressants by determining the effect the oxidized Alpha Olefin $C_{24-28}$ samples had on the pour point of several crude oil distillate simulants. The pour point depressant tests were performed by combining the crude oil distillate simulant and a stock solution of the oxidized normal alpha olefin wax, heating the solution in an oven to 50° C. (122° F.), and then allowing the solution to cool to room temperature. As the pour point depressant test solution cooled, the pour point was periodically evaluated by placing the flask at a 45 degree angle. The highest temperature at which the pour point depressant test solution did not flow was taken to be the pour point.

Crude oil distillate simulants were comprised of 95 grams tridecane and 5 grams of 60° C. (140° F.) melting paraffin wax, or 95 grams tridecane and 5 grams of 74° C. (165° F.) melting paraffin wax. The crude oil simulants were prepared by combining the tridecane and the paraffin wax and heating the simulants in an oven at 60° C. until the paraffin wax was dissolved within the tridecane.

Stock oxidized normal alpha olefin wax solutions were comprised of approximately 0.01 grams of the 7.5 hour oxidized Alpha Olefin $C_{24-28}$ sample from example 25 (25 Alpha Olefin $C_{24-28}$-7.5) and 10 grams of ortho-xylene, or approximately 0.01 grams of the 24 hour oxidized Alpha Olefin $C_{24-28}$ sample from example 25 (25 Alpha Olefin $C_{24-28}$-24) and 10 grams of ortho-xylene. The stock pour point depressant solutions were prepared by combining the oxidized Alpha Olefin $C_{24-28}$ and the ortho-xylene and heating the solution in an oven at 43° C. until the oxidized Alpha Olefin $C_{24-28}$ was completely dissolved.

Figure 1:
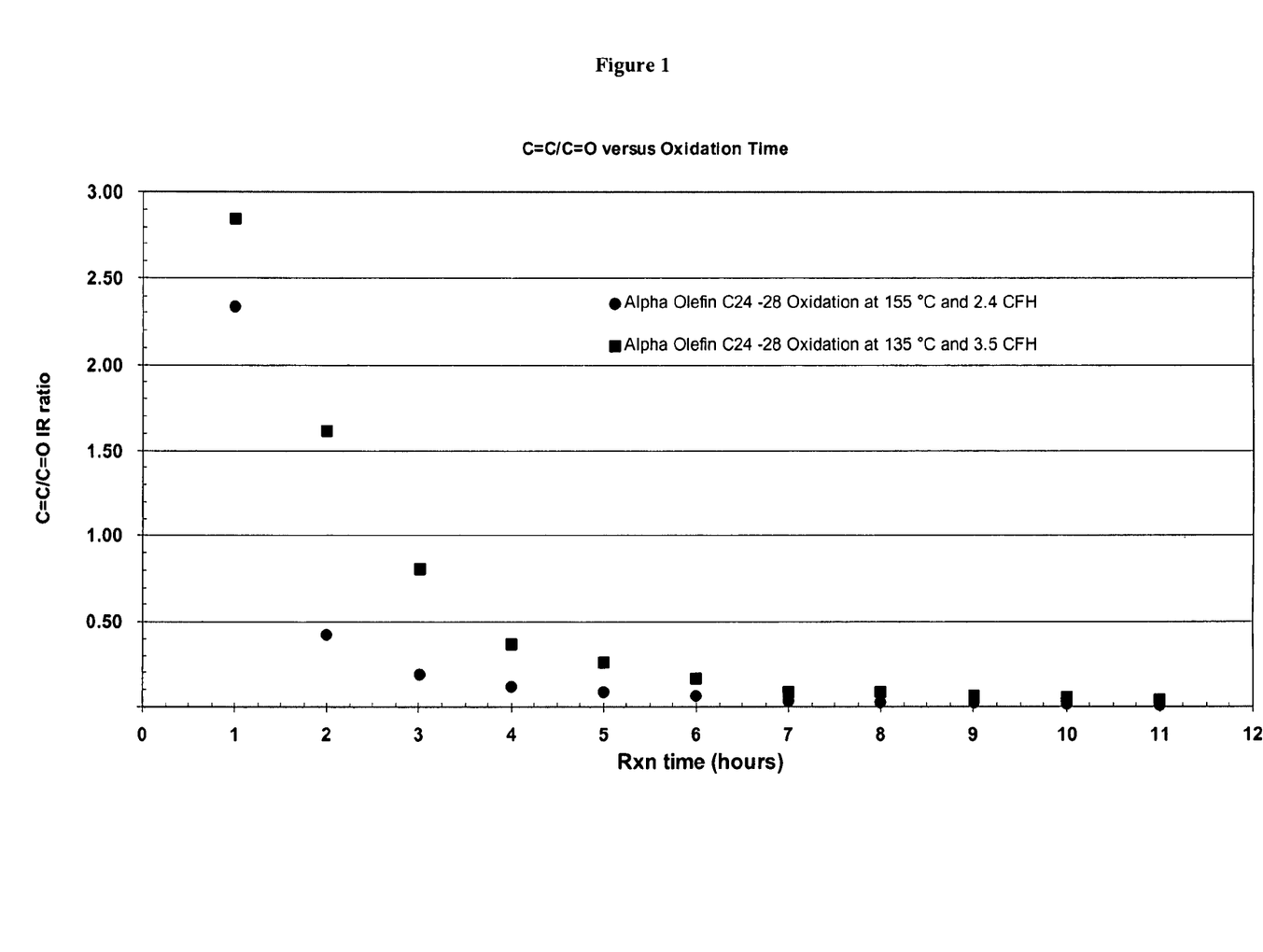
FIG. 1 illustrates how the C=C/C=O ratio changes as a function of oxidation time for two example oxidations of a commercial Alpha Olefin $C_{24-28}$ wax.

Examples 26, 29, 32, and 35 represent control experiments to determine the pour point of the crude oil distillate simulant in the absence of the oxidized Alpha Olefin $C_{24-28}$. Examples 27-28, 30-31, 33-34, and 36-37, determined the effect that the oxidized Alpha Olefin $C_{24-28}$ samples of example 25 had on the pour point of the crude oil distillate simulants. The results of pour point depressant evaluation of the oxidized normal alpha olefin waxes of example 25 are provided in Table 5.

sparger (cylindrical, 1" in length and ⅜" in diameter, average pore size 15 μm), and a side arm connected to a receiving flask. The wax was heated to 135° C. and then a steady stream of air was introduced at 3.5 CFH. The reaction was maintained at temperature 135° C. for 11 hours. Samples of the oxidation reaction were taken hourly beginning at the first hour. The hourly samples were analyzed by FTIR to determine the C=C/C=O ratio of the oxidized Alpha Olefin $C_{24-28}$ hourly samples. These values are shown on FIG. 1.

Examples 40-48

The 1 hour oxidized Alpha Olefin $C_{24-28}$ sample of example 39, the 3 hour oxidized Alpha Olefin $C_{24-28}$ sample of example 39, the 5 hour oxidized Alpha Olefin $C_{24-28}$ sample of example 39, and the 7 hour oxidized Alpha Olefin

TABLE 5

Pour Point Depression in a Crude Oil Distillate Simulant using Oxidized Normal Alpha Olefin Waxes - Examples 26- 37.

| | Crude Oil Distillate Simulant Solution | | Pour Point Depressant | | | | Treated Crude Oil Distillate Parameters | |
|---|---|---|---|---|---|---|---|---|
| Example | Wax Simulant | Quantity of Wax Simulant | Pour Point Depressant | Acid Number | Saponification Number | Quantity of Pour Point Depressant | Pour Point | Pour Point Reduction |
| 26 | 74° C. wax | 5 wt. % | — | — | — | — | 34.6° C. | — |
| 27 | 74° C. wax | 5 wt. % | 25 Alpha Olefin $C_{24-28}$ - 7.5 | 8 | 22 | 91 | 33.3° C. | 1.3° C. |
| 28 | 74° C. wax | 5 wt. % | 25 Alpha Olefin $C_{24-28}$ - 24 | 9 | 40 | 91 | 31.7° C. | 2.9° C. |
| 29 | 74° C. wax | 9.1 wt. % | — | — | — | — | 45.9° C. | — |
| 30 | 74° C. wax | 9.1 wt. % | 25 Alpha Olefin $C_{24-28}$ - 7.5 | 8 | 22 | 91 | 41.8° C. | 4.1° C. |
| 31 | 74° C. wax | 9.1 wt. % | 25 Alpha Olefin $C_{24-28}$ - 24 | 9 | 40 | 91 | 39.3° C. | 6.6° C. |
| 32 | 60° C. wax | 5 wt. % | — | — | — | — | 23.7° C. | — |
| 33 | 60° C. wax | 5 wt. % | 25 Alpha Olefin $C_{24-28}$ - 7.5 | 8 | 22 | 91 | 22.1° C. | 1.6° C. |
| 34 | 60° C. wax | 5 wt. % | 25 Alpha Olefin $C_{24-28}$ - 24 | 9 | 40 | 91 | 21.4° C. | 2.3° C. |
| 35 | 60° C. wax | 9.1 wt. % | — | — | — | — | 30.9° C. | — |
| 36 | 60° C. wax | 9.1 wt. % | 25 Alpha Olefin $C_{24-28}$ - 7.5 | 8 | 22 | 91 | 27.6° C. | 3.3° C. |
| 37 | 60° C. wax | 9.1 wt. % | 25 Alpha Olefin $C_{24-28}$ - 24 | 9 | 40 | 91 | 28.3° C. | 2.6° C. |

Example 38

Alpha Olefin $C_{24-28}$ (Chevron Phillips Chemical Company LP), 500 g, was placed into a four-neck flask equipped with a heating mantle, a thermocouple, a single blade agitator, an air sparger (cylindrical, 1" in length and ⅜" in diameter, average pore size 15 μm), and a side arm connected to a receiving flask. The wax was heated to 155° C. and then a steady stream of air was introduced at 2.5 CFH. The reaction was maintained at temperature 155° C. for 11 hours. Samples of the oxidation reaction were taken hourly beginning at the second hour. The hourly samples were analyzed by FTIR to determine the C=C/C=O ratio of the oxidized normal Alpha Olefin $C_{24-28}$ hourly samples. These values are shown on FIG. 1.

Example 39

Alpha Olefin $C_{24-28}$ (Chevron Phillips Chemical Company LP), 500 g, was placed into a four-neck flask equipped with a heating mantle, a thermocouple, a single blade agitator, an air $C_{24-28}$ sample of example 39 were evaluated as potential pour point depressants by determining the effect the oxidized Alpha Olefin $C_{24-28}$ samples had on the pour point of two crude oil distillate simulants. The pour point depressant tests were performed by combining the crude oil distillate simulant and a stock solution of an oxidized Alpha Olefin $C_{24-28}$ in ortho-xylene, heating the solution in an oven to 50° C. (122° F.), and then allowing the solution to cool to room temperature. As the pour point depressant solution cooled, the pour point was periodically evaluated by placing the flask at a 45 degree angle. The highest temperature at which the pour point depressant test solution did not flow was taken to be the pour point.

Crude oil distillate simulants were comprised of 95 grams tridecane and 5 grams of 60° C. (140° F.) melting paraffin wax, or 95 grams tridecane and 5 grams of 74° C. (165° F.) melting paraffin wax The crude oil simulants were prepared by combining the tridecane and the paraffin wax and heating the simulants in an oven at 60° C. until the paraffin wax was dissolved within the tridecane.

Stock oxidized normal alpha olefin wax solutions were comprised of approximately 0.01 grams of the 1 hour oxidized Alpha Olefin $C_{24-28}$ sample from example 39 (39 Alpha Olefin $C_{24-28}$-1) and 10 grams of ortho-xylene, approximately 0.01 grams of the 3 hour oxidized Alpha Olefin $C_{24-28}$ sample from example 39 (39 Alpha Olefin $C_{24-28}$-3) and 10 grams of ortho-xylene, approximately 0.01 grams of the 5 hour oxidized Alpha Olefin $C_{24-28}$ sample from example 39 (39 Alpha Olefin $C_{24-28}$-5) and 10 grams of ortho-xylene, or approximately 0.01 grams of the 7 hour oxidized Alpha Olefin $C_{24-28}$ sample from example 39 (39 Alpha Olefin $C_{24-28}$-7) and 10 grams of ortho-xylene. The stock pour point depressant solutions were prepared by combining the oxidized Alpha Olefin $C_{24-28}$ wax and the ortho-xylene and heating the solution in an oven at 43° C. until the oxidized Alpha Olefin $C_{24-28}$ wax was completely dissolved.

Examples 39 and 44 represent control experiments to determine the pour point of the crude oil distillate simulant in the absence of the oxidized Alpha Olefin $C_{24-28}$. Examples 40-43, and 45-48, determined the effect that the oxidized Alpha Olefin $C_{24-28}$ of example 39 had on the pour point of the crude oil distillate simulants. The results of pour point depressant evaluation of the oxidized normal alpha olefin waxes of example 39 are provided in Table 6.

TABLE 6

Pour Point Depression in a Crude Oil Distillate Simulant using Oxidized Normal Alpha Olefin Waxes - Examples 40- 48

| | Crude Oil Distillate Simulant Solution | | Pour Point Depressant | | | | Quantity of | Treated Crude Oil Distillate Parameters | |
|---|---|---|---|---|---|---|---|---|---|
| Example | Wax Simulant | Quantity of Wax Simulant | Pour Point Depressant | Acid Number | Saponification Number | C=C/C=O Ratio | Pour Point Depressant | Pour Point | Pour Point Reduction |
| 40 | 74° C. wax | 9.1 wt. % | — | — | — | — | — | 45.9° C. | — |
| 41 | 74° C. wax | 9.1 wt. % | 39 Alpha Olefin $C_{24-28}$ - 1 hour | 0.8 | 3.0 | 2.84 | 91 | 40.6° C. | 5.3° C. |
| 42 | 74° C. wax | 9.1 wt. % | 39 Alpha Olefin $C_{24-28}$ - 3 hour | 2.7 | 9.0 | 0.8 | 91 | 40.1° C. | 5.8° C. |
| 43 | 74° C. wax | 9.1 wt. % | 39 Alpha Olefin $C_{24-28}$ - 5 hour | 5.6 | 16 | 0.26 | 91 | 35.8° C. | 10.0° C. |
| 44 | 74° C. wax | 9.1 wt. % | 39 Alpha Olefin $C_{24-28}$ - 7 hour | 9.8 | 29 | 0.09 | 91 | 36.3° C. | 9.5° C. |
| 45 | 60° C. wax | 9.1 wt. % | — | — | — | — | — | 30.9° C. | — |
| 46 | 60° C. wax | 9.1 wt. % | 39 Alpha Olefin $C_{24-28}$ - 1 hour | 0.8 | 3.0 | 2.84 | 91 | 29.8° C. | 1.1° C. |
| 47 | 60° C. wax | 9.1 wt. % | 39 Alpha Olefin $C_{24-28}$ - 3 hour | 2.7 | 9.0 | 0.8 | 91 | 29.3° C. | 1.6° C. |
| 48 | 60° C. wax | 9.1 wt. % | 39 Alpha Olefin $C_{24-28}$ - 5 hour | 5.6 | 16 | 0.26 | 91 | 27.1° C. | 3.7° C. |
| 49 | 60° C. wax | 9.1 wt. % | 39 Alpha Olefin $C_{24-28}$ - 7 hour | 9.8 | 29 | 0.09 | 91 | 27.8° C. | 3.1° C. |

All of the compositions and methods disclosed and claimed herein can be made and executed without undue experimentation in light of the present disclosure. While the compositions and methods of this invention have been described in terms of particular embodiments, it will be apparent to those of skill in the art that variations may be applied to the compositions and methods and in the steps or in the sequence of steps of the methods described herein without departing from the concept, spirit and scope of the invention as defined by the appended claims.

What is claimed is:

1. A composition comprising a hydrocarbon composition and from 0.0005 to 2.0 weight percent of an oxidized alpha olefin wax pour point depressant having a viscosity at 100° C. between 13.3 and 70.5 cSt.

2. The composition of claim 1, wherein the hydrocarbon composition comprises a crude oil, a crude oil distillate, a residual fuel, a residual oil, or a synthetic hydrocarbon composition.

3. The composition of claim 2, wherein the hydrocarbon composition comprises crude oil, kerosene, diesel fuel, aviation fuel, jet fuel, or fuel oil.

4. The composition of claim 1, wherein the hydrocarbon composition comprises a crude oil.

5. The composition of claim 1, wherein the oxidized alpha olefin wax is derived from an alpha olefin wax having an average molecular weight between 260 and 1000 g/mole.

6. The composition of claim 1, wherein the oxidized alpha olefin wax has an acid number ranging from 0.5 mg to 50 mg KOH/g oxidized alpha olefin wax.

7. The composition of claim 1, wherein the oxidized alpha olefin wax has a C=C/C=O ratio less than 3.

8. A composition of claim 1, wherein a pour point of the hydrocarbon composition is depressed by at least 0.5° C.

9. A method to decrease a pour point of a hydrocarbon composition comprising adding an oxidized alpha olefin wax having a viscosity at 100° C. between 13.3 and 70.5 cSt to the hydrocarbon composition.

10. The method of claim 9, wherein the addition of the oxidized alpha olefin wax decreases the pour point of the hydrocarbon composition by at least 0.5° C.

11. The method of claim 10, wherein the addition of the oxidized alpha olefin wax decreases an average wax particle size in the hydrocarbon composition to less than 50 microns.

12. The method of claim 9, wherein the hydrocarbon composition comprises a crude oil, a crude oil distillate, a residual fuel, a residual oil, or a synthetic hydrocarbon composition.

13. The method of claim 9, wherein the oxidized alpha olefin wax is present in an amount ranging from 0.0005 to 2.0 weight percent of a final hydrocarbon composition.

14. The method of claim 9, wherein the oxidized alpha olefin wax is derived from an alpha olefin wax having an average molecular weight between 260 and 1000 g/mole.

15. The method of claim 9, wherein the oxidized alpha olefin wax has an acid number between 4 mg KOH/g oxidized wax and 50 mg KOH/g oxidized alpha olefin wax.

16. The method of claim 9, wherein the oxidized alpha olefin wax has a C=C/C=O ratio less than 3.

17. A method of decreasing an average wax particle size in a hydrocarbon composition comprising adding an oxidized alpha olefin wax having a viscosity at 100° C. between 13.3 and 70.5 cSt to the hydrocarbon composition.

18. The method of claim 17, wherein the addition of the oxidized alpha olefin wax decreases the average wax particle size in the hydrocarbon composition to less than 50 microns.

19. A method to decrease a pour point of a hydrocarbon composition consisting essentially of adding an oxidized alpha olefin wax concentrate to the hydrocarbon composition, wherein the oxidized alpha olefin wax has a viscosity at 100° C. between 13.3 and 70.5 cSt.

20. The method of claim 19, wherein the oxidized alpha olefin wax concentrate comprises the oxidized alpha olefin wax and a solvent.

21. The method of claim 20, wherein the alpha olefin wax concentrate also comprises one or more materials including antioxidants, corrosion or rust inhibitors, haze inhibitors, foam inhibitors, dispersants, emulsifying agents, detergents, viscosity index improvers, extreme pressure agents, dyes, and/or dye stabilizers.

22. The method of claim 19, wherein the oxidized alpha olefin wax concentrate comprises from 1 to 45 weight percent of the oxidized alpha olefin wax.

23. The method of claim 19, wherein the addition of the oxidized alpha olefin wax concentrate decreases the pour point of the hydrocarbon composition by at least 0.5° C.

24. The method of claim 23, wherein the addition of the oxidized alpha olefin wax concentrate decreases an average wax particle size in the hydrocarbon composition to less than 50 microns.

25. The method of claim 19, wherein the hydrocarbon composition comprises a crude oil, a crude oil distillate, a residual fuel, a residual oil, or a synthetic hydrocarbon composition.

26. The method of claim 19, wherein the oxidized alpha olefin wax is present in an amount ranging from 0.0005 to 2.0 weight percent of a final hydrocarbon composition.

27. The method of claim 19, wherein the oxidized alpha olefin wax is derived from an alpha olefin wax having an average molecular weight between 260 and 1000 g/mole.

28. The method of claim 19, wherein the oxidized alpha olefin wax has an acid number between 4 mg KOH/g oxidized wax and 50 mg KOH/g oxidized alpha olefin wax.

29. The method of claim 19, wherein the oxidized alpha olefin wax has a C=C/C=O ratio less than 3.

* * * * *